(12) United States Patent
Sakai

(10) Patent No.: US 7,209,610 B2
(45) Date of Patent: Apr. 24, 2007

(54) PHOTORECEPTOR DEVICE MODULE

(75) Inventor: Kiyohide Sakai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/521,112

(22) PCT Filed: Jul. 11, 2003

(86) PCT No.: PCT/JP03/08858

§ 371 (c)(1),
(2), (4) Date: Aug. 16, 2005

(87) PCT Pub. No.: WO2004/019417

PCT Pub. Date: Mar. 4, 2004

(65) Prior Publication Data

US 2006/0110104 A1    May 25, 2006

(30) Foreign Application Priority Data

Jul. 12, 2002    (JP) .............................. 2002-204781

(51) Int. Cl.
G02B 6/30 (2006.01)
G02B 6/36 (2006.01)
G02B 6/00 (2006.01)

(52) U.S. Cl. .......................... 385/33; 385/31; 385/49; 385/88; 385/92

(58) Field of Classification Search .................... None
See application file for complete search history.

(56) References Cited

U.S. PATENT DOCUMENTS

| | | | |
|---|---|---|---|
| 5,335,243 A * | 8/1994 | Kubena et al. | 372/99 |
| 5,771,322 A | 6/1998 | Matsumoto et al. | |
| 6,257,773 B1 | 7/2001 | Moriyama et al. | |
| 6,813,418 B1 * | 11/2004 | Kragl | 385/49 |
| 2002/0001870 A1 | 1/2002 | Oda et al. | |

FOREIGN PATENT DOCUMENTS

| | | |
|---|---|---|
| JP | 57-195209 | 11/1982 |
| JP | 1-88907 U | 6/1989 |

(Continued)

OTHER PUBLICATIONS

Kubota, Hiroshi; "Applied Optics", (Dec. 19, 1959).

*Primary Examiner*—Sung Pak
(74) *Attorney, Agent, or Firm*—Leydig, Voit & Mayer, Ltd.

(57) ABSTRACT

A light receiving element module includes a stem which signal pins penetrate; a base which is fixed in a direction perpendicular to the stem; a cap member which has a light passing-through hole and is fixed to the stem; a spherical lens which is inserted into the light passing-through hole and condenses signal light emitted from the optical fiber; a parabolic mirror which is arranged on the base and reflects the signal light condensed by the spherical lens at approximately a right angle; a light detecting element which is arranged on the base and detects the signal light reflected by the parabolic mirror and converts the signal light into an electrical signal; and a trans-impedance amplifier which is arranged on the base in proximity to the light detecting element and amplifies the electrical signal produced by the light detecting element.

14 Claims, 14 Drawing Sheets

FOREIGN PATENT DOCUMENTS

| | | |
|---|---|---|
| JP | 2-130507 | 5/1990 |
| JP | 4-57006 | 2/1992 |
| JP | 4-88308 | 3/1992 |
| JP | 8-172207 | 7/1996 |
| JP | 8-227029 | 9/1996 |
| JP | 9-222564 | 8/1997 |
| JP | 11-190812 | 7/1999 |
| JP | 2000-28872 | 1/2000 |
| JP | 2001-345456 | 12/2001 |

* cited by examiner

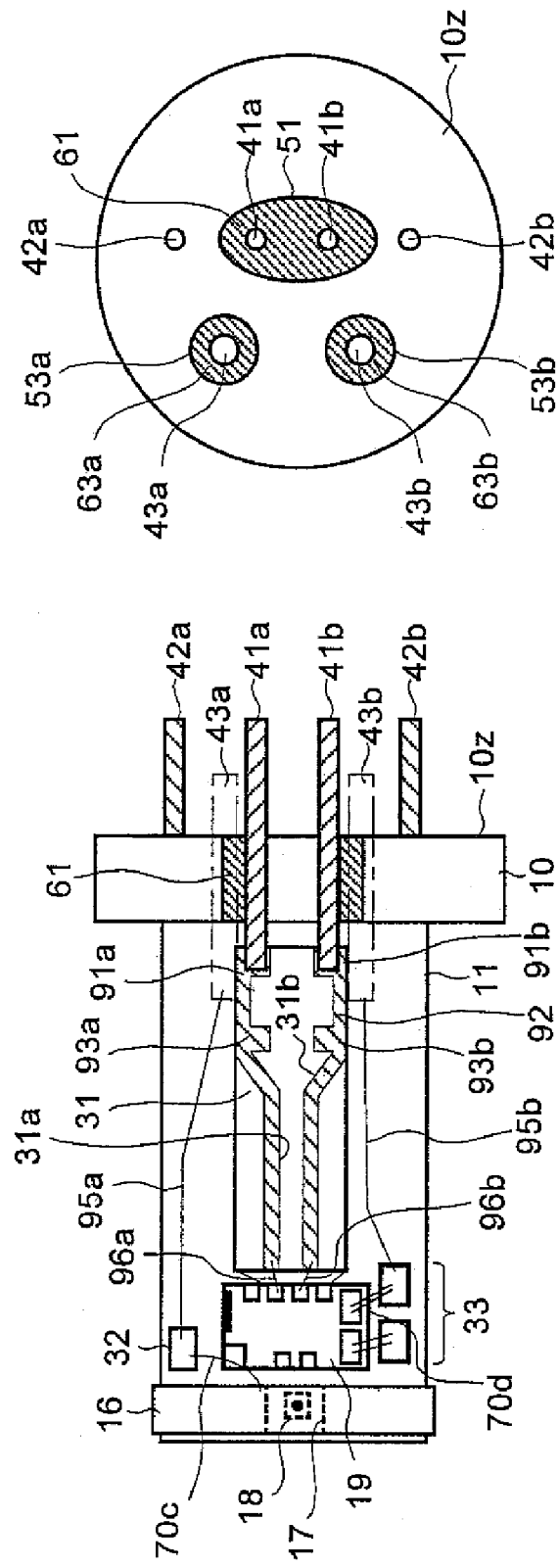

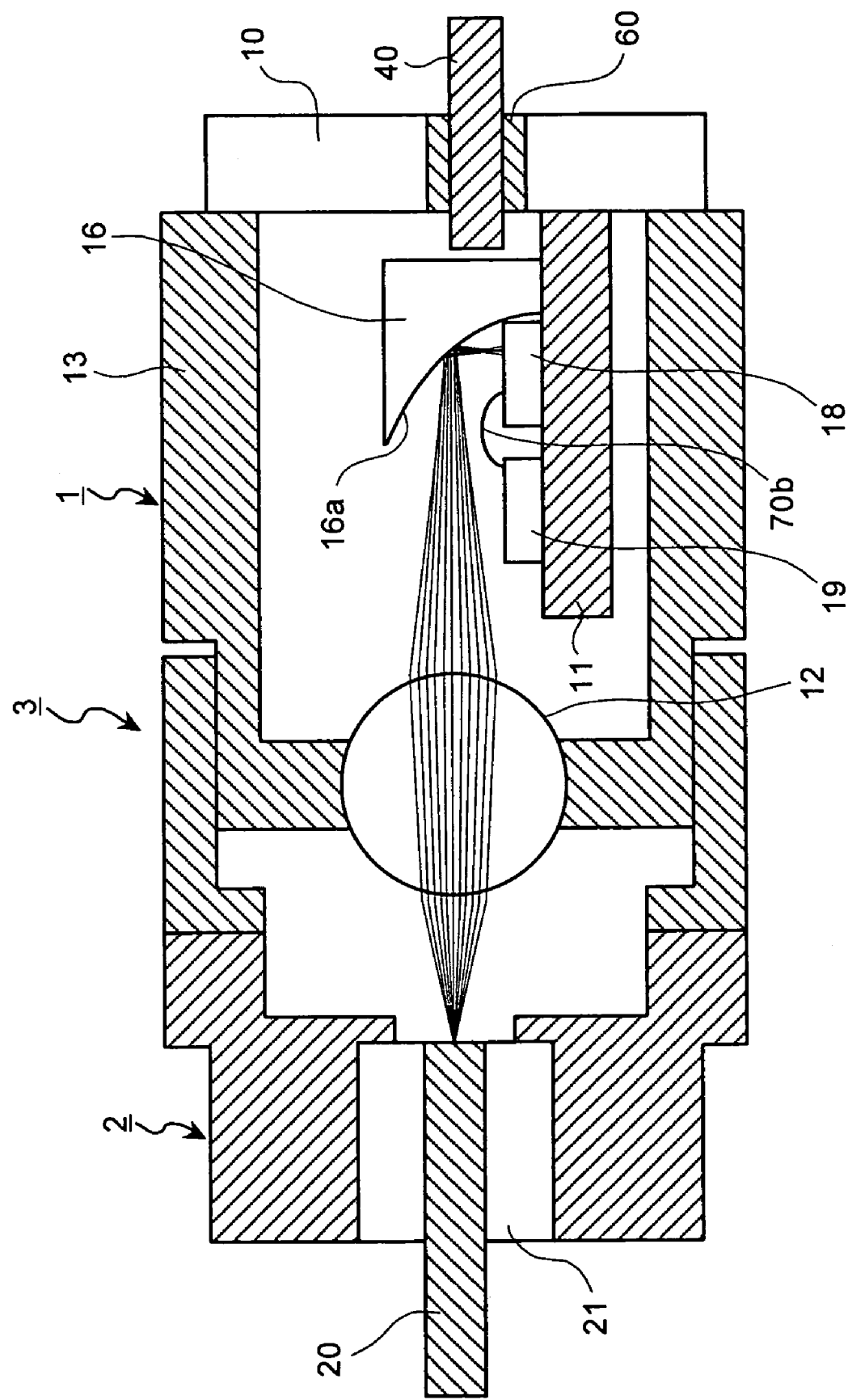

PHOTORECEPTOR DEVICE MODULE

TECHNICAL FIELD

The present invention relates to a light receiving element module on which a semiconductor light detecting element such as a photodiode is mounted, and, in particular, to a coaxial type light receiving element module connected to an optical fiber or a light receiving element module with an adapter for connection of an optical fiber.

BACKGROUND ART

In recent years, in an optical communication system which transmits an optical signal via an optical fiber, a speedup of a transmission of an optical signal is remarkable for responding to increase of communication traffic due to population of the Internet, where the transmission speed is being switched from 2.5 Gb/s to 10 Gb/s and research and development is being now advanced toward realization of a transmission speed of 40 Gb/s. According to such trends, it is required to meet a speeding-up regarding a transmission speed of a signal which is handled by an optical transmitting/receiving device.

The optical transmitting/receiving device converts a data signal to be transmitted from an electric signal to an optical signal to transmit the optical signal via an optical fiber for transmission, and receives an optical signal via an optical fiber for reception to reproduce the received optical signal to an electric signal.

As a light receiving element module used in such a kind of light receiver, for example, the technique described in Japanese Patent Publication No. 2907203 has been well known. In the patent publication, an optical module has been disclosed which is provided with a box-like housing which accommodates a light receiving element and has a mounting face on which the light receiving element is mounted, a sleeve which extends from a side wall of the box-like housing in a predetermined direction and supports a ferrule mounted at a distal end of an optical fiber in a state that the ferrule has been accommodated therein, an oval face reflecting mirror which is accommodated in the box-like housing for coupling the optical fiber and the light receiving element optically, and a supporting structure for holding the oval face reflecting mirror at a predetermined position inside the box-like housing in a state that the oval face reflecting mirror has been separated from the mounting face in the box-like housing by a predetermined distance.

in the technique described in the patent publication, however, since the oval face reflecting mirror is used, it is necessary to elongate a focal length of the reflecting mirror in order to arrange the optical fiber and the light receiving element optimally, which causes such a problem that the light receiving element module can not be reduced in size. Further, since a space between a reflecting point of the reflecting mirror and the light receiving element is large and the focal length is long, a thermal expansion of the material for the reflecting mirror occurs due to an environmental temperature. As a result, there is a problem that since change of an image point position becomes large, a compensation unit for the image point position illustrated in the Japanese Patent Publication No. 2907203 is required for preventing the change, which results in complication in structure. Furthermore, since the shape of the reflecting mirror has the oval face, there occurs such a problem that it is necessary to use a mirror-finishing milling machine for manufacturing a forming mold for a mirror face used in a plastic mold and it is difficult to secure a face accuracy.

Accordingly, an object of the present invention is to provide a light receiving element module with a simple structure, which does not require a complicated structure such as a temperature compensation unit for an image point position, and which can be reduced in size.

DISCLOSURE OF THE INVENTION

A light receiving element module according to the invention detects signal light emitted from an optical fiber and includes a lens which condenses signal light emitted from the optical fiber; a reflecting mirror which has a quadric surface which reflects the signal light condensed by the lens; and a light detecting element which detects the signal light reflected by the reflecting mirror and converts the signal light into an electrical signal.

The reflecting mirror may be a parabolic mirror.

The signal light condensed by the lens may be incident on the reflecting surface generally in parallel with the axis of the reflecting surface, and the signal light which is incident on a position offset from the center of the reflecting mirror by approximately a radius may be reflected on the reflecting surface.

The signal light condensed by the lens may be incident on the reflecting surface generally in parallel with the axis of the reflecting surface, and the signal light incident may be reflected at an approximately right angle on the reflecting surface.

The reflecting mirror may be a hyperboloid mirror.

The lens may be a spherical lens.

The light receiving element module may include a trans-impedance amplifier which is arranged on the same flat face as the light detecting element in proximity to the light detecting element and amplifies the electrical signal converted by the light detecting element.

The reflecting mirror may be a member which is formed by using a plastic mold and on which a reflecting surface is provided.

Adjustment of the optical axis of the optical fiber in three axial directions of the optical axis direction and two directions perpendicular to the optical axis with respect to an optical axis provided by the optical fiber and the lens, may be performed.

A light receiving element module according to the invention detects signal light emitted from an optical fiber, and includes a stem which signal pins penetrate; a base which is fixed in a direction perpendicular to the stem; a cap member which has a light passing-through hole and is fixed to the stem; a spherical lens which is inserted into the light passing-through hole and condenses signal light emitted from the optical fiber; a parabolic mirror which is arranged on the base and reflects the signal light condensed by the spherical lens at approximately a right angle; a light detecting element which is arranged on the base and detects the signal light reflected by the parabolic mirror and converts the signal light to an electrical signal; and a trans-impedance amplifier which is arranged on the base in proximity to the light detecting element and amplifies the electrical signal produced by the light detecting element.

A light receiving element module according to the invention detects signal light emitted from an optical fiber, includes a stem which signal pins penetrate; a base which is fixed in a direction perpendicular to the stem; a cap member which has a first light passing-through hole and is fixed to the stem; a window member which covers the first light passing-through hole; a lens holding member which has a second light passing-through hole and is fixed to the cap member; a spherical lens which is inserted into the second light passing-through hole and condenses signal light emitted from the optical fiber; a parabolic mirror which is arranged on the base and reflects the signal light condensed by the spherical lens at approximately a right angle; a light detecting element which is arranged on the base and detects the signal light reflected by the parabolic mirror and converts the signal light to an electrical signal; and a trans-impedance amplifier which is arranged on the base in proximity to the light detecting element and amplifies the electrical signal produced by the light detecting element.

BRIEF DESCRIPTION OF THE DRAWINGS

FIGS. 9A and 9B are longitudinal and sectional views, respectively, of the light receiving element module of FIG. 1;

FIG. 13 explains a light receiving element module of a third embodiment; and

BEST MODE FOR CARRYING OUT THE INVENTION

Exemplary embodiments of a light receiving element module according to the present invention are described below with reference to the accompanying drawings.

First Embodiment

With reference to FIG. 1 to FIGS. 11A, 11B, and 11C, a light receiving element module of the first embodiment of this invention will be explained. The light receiving element module of this first embodiment has the module aspect of an inexpensive can-package type, and a photodiode is housed in a package as a light detecting element. Further, in the description, the light receiving element module is a generic name given to modules including a light receiving element module which does not have a cap (a lid) for sealing.

Figure 1:
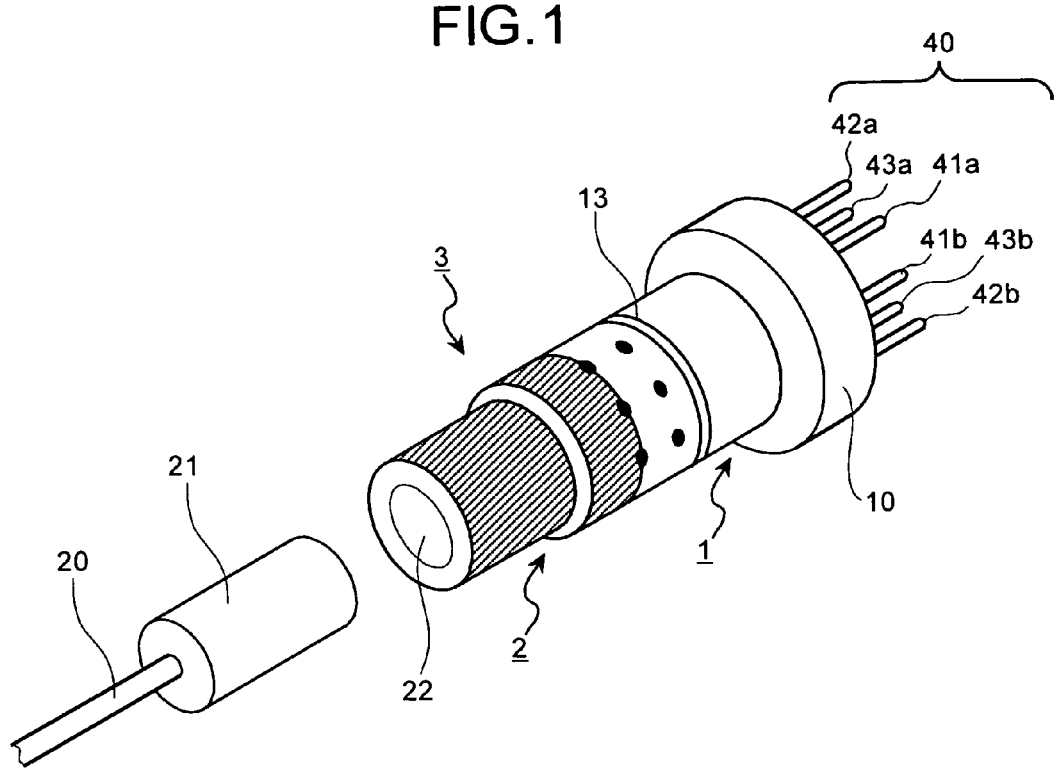
FIG. 1 illustrates an appearance constitution of a light receiving element module according to a first embodiment.

FIG. 1 illustrates an appearance constitution of a light receiving element module 3. As illustrated in FIG. 1, the light receiving element module 3 includes a can-package 1 provided with a cap member 13 and a stem 10, and a receptacle 2 in which a ferrule 21 connected with an optical fiber 20 is inserted. The stem 10 generally has a diameter of 6 millimeters or less.

Figure 2:
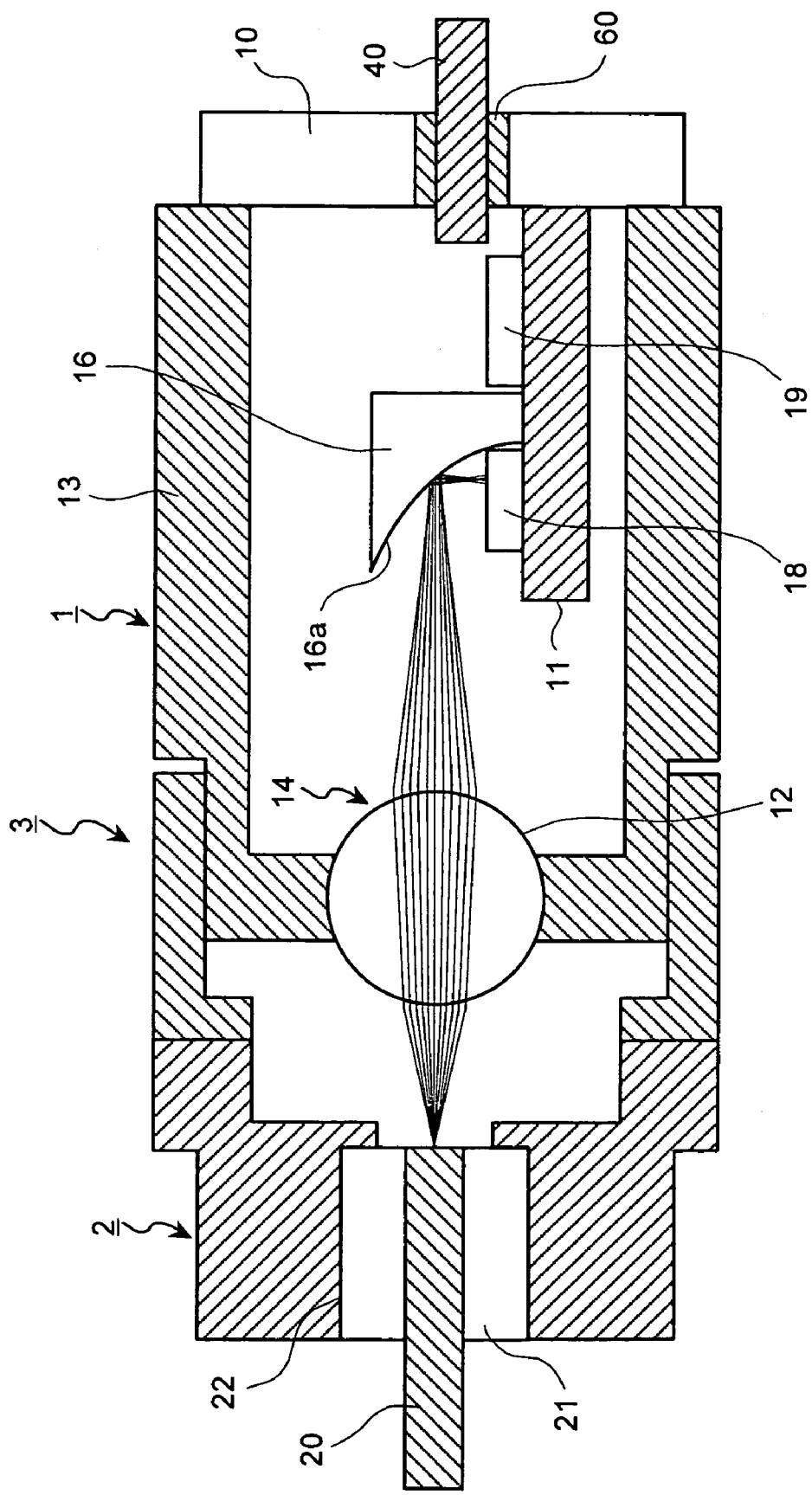
FIG. 2 schematically illustrates a vertical sectional view of the light receiving element module in FIG. 1.

FIG. 2 schematically illustrates a vertical sectional view of the light receiving element module 3 for explaining the light detecting principle of the light receiving element module 3 of FIG. 1. FIG. 2 illustrates the structure of FIGS. 8A and 8B described later in a simplified manner, where illustration of some portions is omitted and some portions are illustrated in simplified manner.

As illustrated in FIG. 2, the light receiving element module 3 includes a stem 10 which a signal pin 40 (corresponds to signal pins 41a and 41b, ground pins 42a and 42b, and voltage supplying pins 43a and 43b) penetrates, a base 11 fixed to the stem 10 in a direction perpendicular thereto, a cap member 13 which has a light passing-through hole 14 and is fixed to the stem 10, and a spherical lens 12 which condenses signal light emitted from the optical fiber 20. Further, the light receiving element module includes a parabolic mirror 16 which is disposed on the base 11 and reflects the signal light condensed by the spherical lens 12 approximately at a right angle, a light receiving element 18 which is disposed on the base 11 and receives the signal light reflected by the parabolic mirror 16 to convert the same to an electric signal, a trans-impedance amplifier 19 which is disposed on the base 11 in proximity to the light receiving element 18 and amplifies the electric signal converted by the light receiving element 18 and the like. With the light receiving element 18, a photodiode is used in this embodiment.

The signal pin 40 penetrates the stem 10 via a dielectric 60 7(corresponding to dielectrics 61, 63a, and 63b), and the base 11 and the cap member 13 are fixed to the stem 10 in a direction perpendicular thereto. The light receiving element 18, the parabolic mirror 16 and the trans-impedance amplifier 19 are put on the base 11 in proximity to one another. The light passing-through hole 14 for inserting the spherical lens 12 is formed in the cap member 13, and the spherical lens 12 is inserted into the light passing-through hole 14 of the cap member 13 so that a sealed structure of the interior of the cap member can be achieved. The spherical lens 12 can be constituted by, for example, an inexpensive BK7 (having a reflection index of 1.51: Trade Name of Shot Inc.). Further, the receptacle 2 formed with an insertion hole 22 for inserting the ferrule 21 is fixed to the cap member 13. The parabolic mirror 16 has a reflecting surface 16a, and it is arranged such that the signal light condensed by the spherical lens 12 is incident on a portion of the parabolic face (the reflecting surface) which is offset from a rotation symmetry axis at a distance corresponding to about a radius. Incidentally, the radius used here means a radius of curvature of the parabolic face described later.

A transmission route of signal light emitted from the optical fiber 20 will be explained next. Signal light emitted from the optical fiber 20 is incident on the spherical lens 12. The spherical lens 12 condenses incident signal light. A principal ray of the signal light condensed by the spherical lens 12 is incident on the reflecting surface 16a generally in parallel to the rotation symmetry axis of the reflecting surface 16a of the parabolic mirror 16. The incident signal light is reflected generally at a right angle on the reflecting surface 16a of the parabolic mirror 16 to be incident on the light receiving element 18. The signal light is condensed by the reflection due to the characteristic of the parabolic mirror 16. The light receiving element 18 converts incident signal light to an electric signal to output the same to the trans-impedance amplifier 19. In the trans-impedance amplifier 19, the electric signal from the light receiving element 18 is amplified, is outputted through the signal pin 40 to an external upper system. Thus, according to the light receiving element module of the present invention, two-stage condensation is performed at the spherical lens 12 and the parabolic mirror 16.

The arrangement of the optical fiber 20, the spherical lens 12, the parabolic mirror 16, and the light detecting element 18 will be explained briefly. A virtual image of a light detecting face (a photo detector, (hereinafter, "PD") light detecting face) of a light drafting element is located on an optical axis of signal light emitted from the optical fiber. On the other hand, a portion (hereinafter, "an emitting point") of the optical fiber from which a signal light is emitted is arranged on an object point, and a real image is imaged at the imaging point of the optical fiber on the optical axis of the signal light by the spherical lens. At this time, the optical fiber 20, the spherical lens 12, the parabolic mirror 16 and the light receiving element 18 are arranged such that the position of the real image of the emitting point of the optical fiber is imaged on the position of the virtual image of the light detecting face. That is, the virtual image is formed on the light detecting face of the light detecting element by the reflecting mirror on the optical axis of the lens, and the lens transfers the light emitting point of the optical fiber placed at the object point to the virtual image plane of the light detecting face of the light detecting element. In other words, such a constitution can be employed that a fiber image is formed on the optical axis of the lens, and the fiber image is transformed to the light detecting face of the light detecting element by the parabolic mirror.

Figure 3:
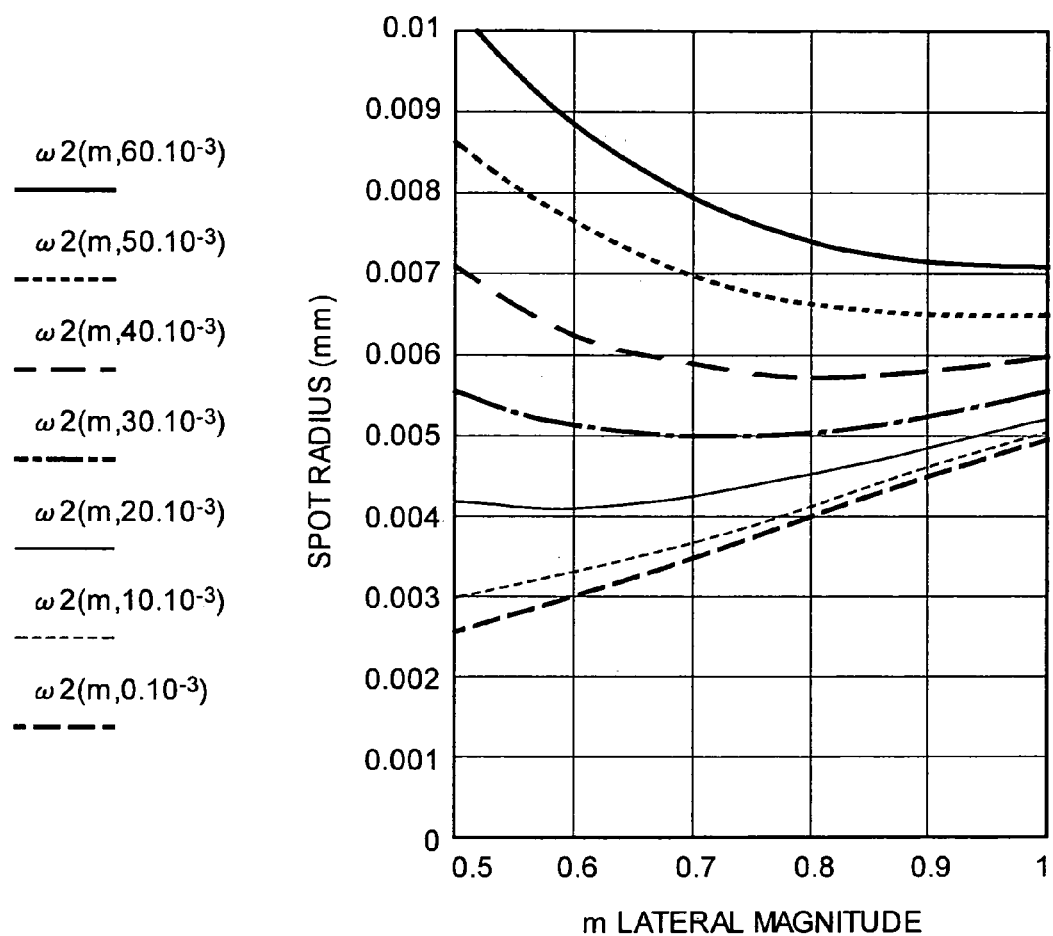
FIG. 3 is a diagram for explaining spreading of a Gaussian beam.
Figure 4:
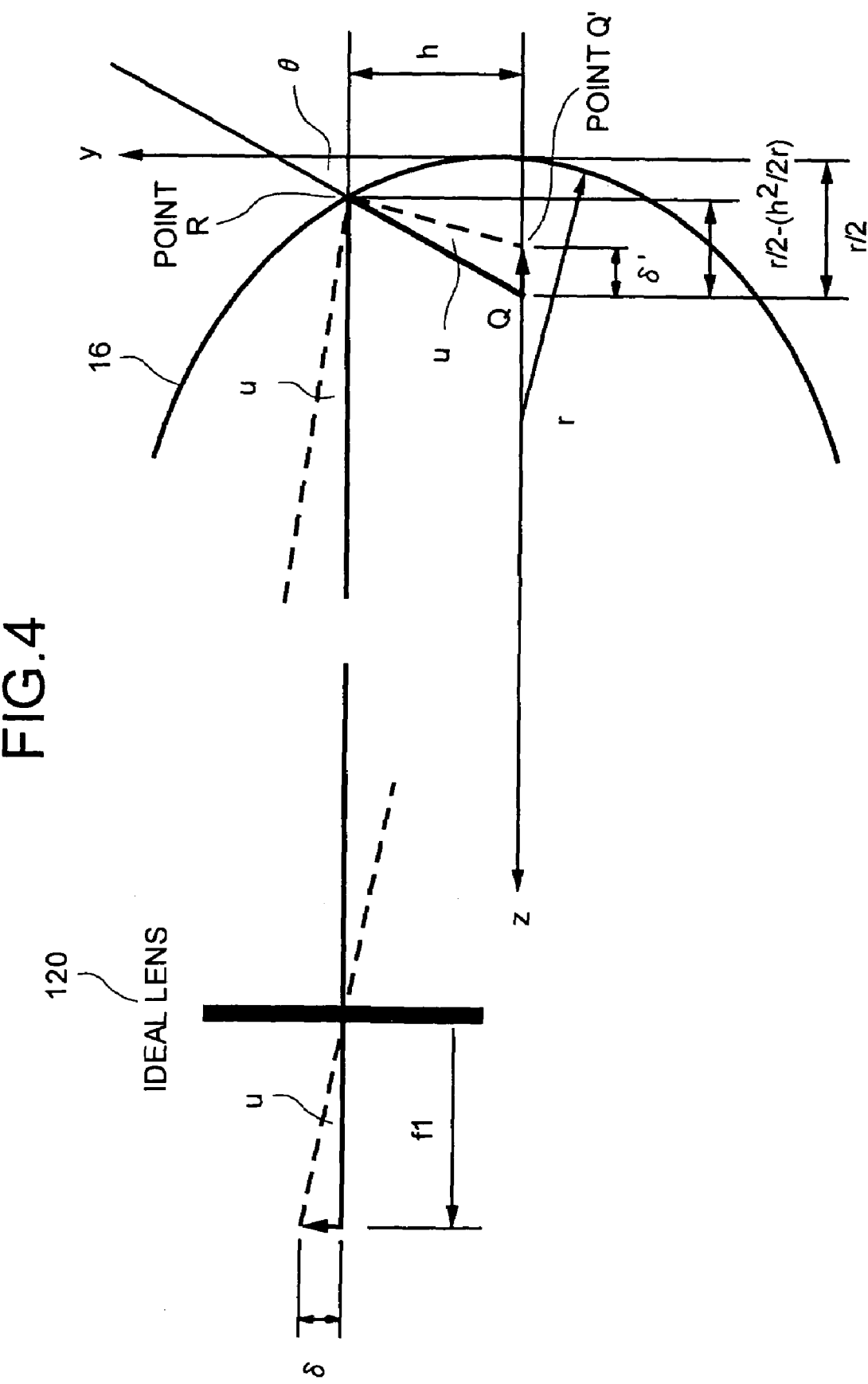
FIG. 4 is a diagram for explaining various symbols.
Figure 5:
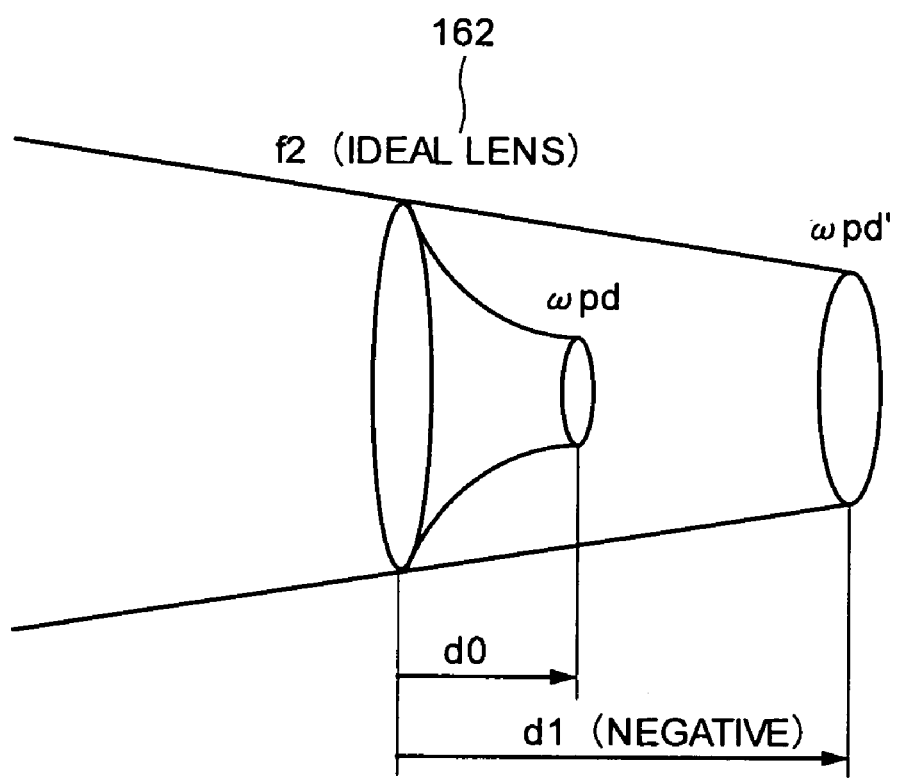
FIG. 5 is a diagram for explaining various symbols.

A specific design example of the spherical lens 12 and the parabolic mirror 16 will be explained next with reference to FIG. 3 to FIGS. 7A and 7B. The magnification of the spherical lens 12 will be first explained using FIG. 3 to FIG. 5. FIG. 3 is a diagram for explaining spreading of a Gaussian beam, and FIG. 4 and FIG. 5 are diagrams for explaining various symbols.

Supposing an ideal lens, a spot radius ω2 of an image, where an optical fiber with a spot radius ω1 which is located on an object point and emits light with a wavelength λ, is on an image plane defocused from a paraxial image point by a distance z via an ideal lens of a lateral magnification m, can be expressed by the following equation (1).

$$\omega_2(z) = m\omega_1 \sqrt{1 + \left(\frac{\lambda z}{\pi(m\omega_1)^2}\right)^2} \quad (1)$$

FIG. 3 illustrates spot radiuses on an image plane between the paraxial image point and the defocus from 0 to 60 micrometers obtained via an ideal lens with a lateral magnification of 0.5 to 1 for each 10 micrometers regarding an optical fiber with a wavelength of 1.3 micrometers and a spot radius of 5 micrometers utilizing the equation (1). Since the Gaussian beam outside about 1.5 times a spot radius (a light intensity of $1/e^2$) causes loss of about 2%, a spot radius of 7.5 micrometers or less to the light receiving element with a radius of 10 micrometers used for light transmission of 10 Gb/s satisfies a suitable condition. Incidentally, introductory remarks in FIG. 3 mean a lateral magnification and a defocus amount (millimeter). That is, for example, ω2 (m, 60×10$^{-3}$) means a spot radius (ω2) obtained when the lateral magnification is m times and the defocus amount is 60 micrometers.

When considering, for example, a thickness tolerance of ±30 micrometers from FIG. 3, it is understood that the lateral magnification of 0.7 is optimal. However, a lateral magnification of about 1 is excellent in an optical system having a large optical axis shift (for example, of the defocus amount of 60 micrometers) and so on. Practically, considering an image blur due to the aberration of the optical system and an assembling tolerance, the lateral magnification of the whole optical system is set to a range of 0.5 to 1.

The optical system including the lens 12 and the parabolic mirror 16 will be explained next with reference to FIG. 4. In FIG. 4, it is assumed that the lens 12 is an ideal lens 120 with a focal length f1 and the parabolic mirror 16 has a reflecting surface 16a constituting a paraboloid 16 with a radius of curvature r in the vicinity of a rotation symmetry axis z. The parabolic face 16 is a paraboloid of $z=y^2/2\,r$ to an axis y perpendicular to the optical axis, and a principal ray from the lens is incident on a position (a point R) of the height h from the rotation symmetry axis and is reflected. An inclination of a principal ray generated in a manner shifted from the optical axis by δ is defined as u, a crossing point between a ray reflected at a time of u=0 and the rotation symmetry axis is defined as a point Q, an angle formed between the reflected beam and y axis is defined as θ, and the position where the point Q is shifted by δ' at a time of angle u is defined as Q'. According to the paraxial and coaxial optical system, it is assumed that the magnification is defined as γ=δ'/δ in the optical system of FIG. 4. Since δ=f$_1$ tan u, $$RQ' = \frac{h}{\cos\theta},$$

and $$\delta = RQ' \cdot \frac{\sin u}{\cos\theta} = \frac{h \sin u}{\cos^2\theta}$$

is obtained from FIG. 4, the magnification is obtained by the following equation.

$$\gamma = \frac{h}{f_1} \frac{\sin u}{\tan u} \frac{1}{\cos^2\theta} \approx \frac{h}{f_1} \frac{1}{\cos^2\theta} \quad (2)$$

Since the paraboloid is $$z = \frac{y^2}{2r},$$

the angle θ can be obtained from $$\tan\theta = \frac{\frac{r}{2} - \frac{h^2}{2r}}{h}.$$

According to the equation (2), it will be understood that the magnification y is influenced by the position h on the paraboloid 16 upon the principal ray is incident. When such a usage is applied, the parabolic mirror 16 may be used in the vicinity of h≈r for reducing aberration, and it can be thought that the focal length is f2=r, and a principal plane is a plane including R point at which the principal ray is incident upon the reflecting mirror.

A partial system of an optical system constituting the parabolic mirror 16 is explained with reference to FIG. 5. Considering that the parabolic mirror 16 is an ideal lens 162 with a focal length f2, and assuming that a spot radius formed on a light detecting face of the light detecting element is ωpd, a space between the light detecting face and the principal plane is d0, a spot radius of a virtual image is ωpd', and the distance between the virtual image and the principal plane is d1 (which is a virtual image and takes a negative number), the lateral magnification m2 of the partial system and d1 can be expressed by the following equations.

$$m2 = \frac{\omega_{pd}}{\omega_{pd}'} = \sqrt{\left(\frac{\pi\omega_{pd}^2}{\lambda}\right)^2\left(\frac{1}{f_2}\right)^2 + \left(1 - \frac{d_0}{f_2}\right)^2} \quad (3)$$

$$d_1 = \frac{\left(\frac{\pi\omega_{pd}^2}{\lambda}\right)^2\left(\frac{1}{f_2}\right) - d_0\left(1 - \frac{d_0}{f_2}\right)}{\left(\frac{\pi\omega_{pd}^2}{\lambda}\right)^2\left(\frac{1}{f_2}\right)^2 + \left(1 - \frac{d_0}{f_2}\right)^2} \quad (4)$$

Figure 6A:
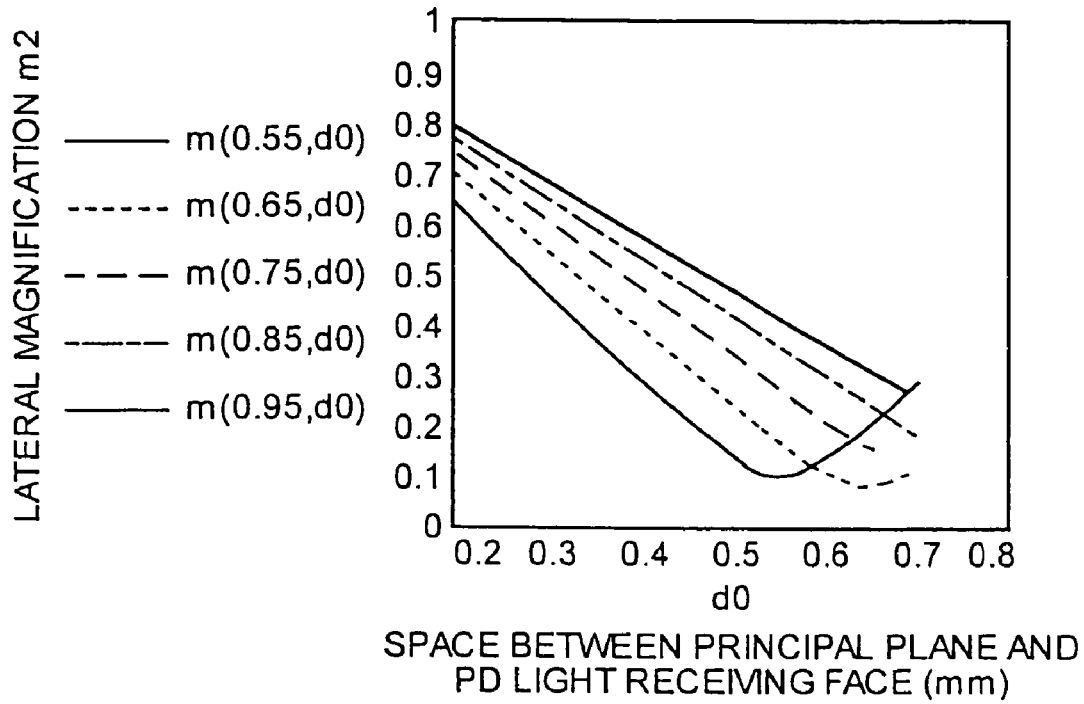
FIGS. 6A and 6B are diagrams for explaining relationship between space between an object point and lens and lateral magnification.
Figure 6B:
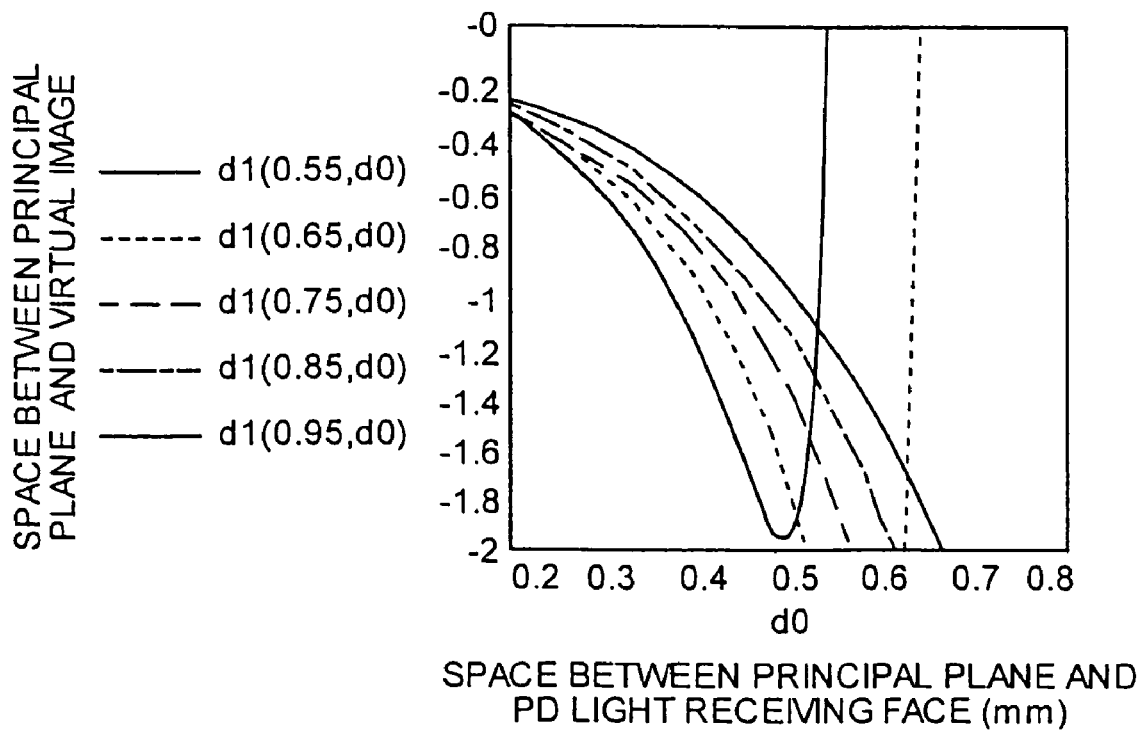

FIG. 6A illustrates a lateral magnification m2 of the partial system corresponding to the distance d0 showing the space between the principal plane and the light detecting face (PD light detecting face) 18a of the light detecting element 18 regarding the parabolic mirror 16 having a parabolic face with a radius r varying from 0.55 millimeters to 0.95 millimeters. Further, FIG. 6B illustrates the virtual image position d1 versus the distance d0 regarding the reflecting mirror having the paraboloid 16 with the radius r varying from 0.55 millimeter to 0.95 millimeter. Incidentally, introductory remarks in respective diagrams of FIGS. 6A and 6B mean the radius (millimeters) of the paraboloid of the parabolic mirror 16 and the space (millimeters) between the principal plane and the light detecting face (PD light detecting face) 18a of the light detecting element 18. That is, for example, m2 (0.55, d0) means the lateral magnification (m2) when the radius is 0.55 millimeter and the space between the principal plane and the PD light receiving face is d0.

In a simplified example, assuming that the lateral magnification m of the entire optical system is one and the lateral magnification m2 of the partial system obtained by the reflecting mirror of the parabolic face 16 is 0.5, the distance between the point R (principal plane) and the PD light detecting face 18a varies from 0.28 millimeter to 0.48 millimeter according to variation of the radius r of the reflecting mirror having the paraboloid 16 from 0.55 millimeter to 0.95 millimeter, which is suitable for maintaining the height of the rising portion of a wire bond used for wiring of the light detecting element 18, so that the wire bond and the reflecting mirror face of the parabolic mirror 16 do not contact each other.

A partial system of the spherical lens 12 will be explained next. A first lens on which light emitted from the optical fiber 20 is incident is a spherical lens 12 with a radius R and a refractive index n, and its focal length is f1=R/(2(n−1)). A ray trace in FIG. 2 illustrates a diagram where 11 rays have been traced in a range of NA 0.2 for each NA 0.04, where a ray with NA 0.16 and a ray with NA 0.2 cross. In this manner, though the spherical lens 12 is inexpensive, its spherical aberration is large and aberration increasing distribution of a lens power (a refractive power) increases, so that the aberration is suppressed by setting the lateral magnification of the partial system of the lens to two times and distributing power to the parabolic mirror 16. In this connection, since NA of the optical fiber for the wavelength of 1.3 micrometers and the spot radius of 5 micrometers is 0.1 at an intensity of 1/e$^2$ and a light intensity distribution of about 98% can be achieved at NA of 0.15, blur of an image becomes very small with such an aberration distribution.

Incidentally, for example, assuming the reflecting mirror of the parabolic mirror 16 is a flat mirror and aberration is achieved by an finite system including one lens, even assuming a preferable lateral magnification is about 0.8 to 0.9 or so, a shading loss to a light receiving radius of 10 micrometers becomes large as about 5%. Therefore, the lateral magnification of the partial system of the lens is preferably designed one time or more.

The constitution of the parabolic reflecting mirror will be explained next. A hyperbolic reflecting mirror can achieve an aplanatic condition in the optical system illustrated in FIG. 2, and a parabolic reflecting mirror (the parabolic mirror 16) can achieve an aplanatic condition when it converges a collimated beam. However, the parabolic reflecting mirror has a rotation symmetry axis that is parallel to the optical axis so that forming molds can be manufactured by a mirror finishing lathe with a high cutting accuracy instead of a mirror finishing milling machine for manufacturing an oval surface or a hyperboloid, and assembling of the forming molds can be easy.

A coefficient of thermal expansion α of plastic suitable for manufacturing a parabolic reflecting mirror (the parabolic mirror 16) is 5.6×10$^{-5}$. For example, a movement of the reflecting point (R point) from a bottom of the reflecting mirror is about 2.5 micrometers when a parabolic mirror with a radius r of 0.85 millimeters is used with lateral magnification of 0.5 and the temperature varies from 25° C. to 85° C., assuming that a space between a reflecting point (R point in FIG. 4) and a light receiving face (the PD light receiving face) 18a of the light receiving element 18 is 450 micrometers, the thickness of a light receiving element 18 is 150 micrometers, and the thickness of a substrate (a chip carrier) for a light receiving element 17 made of ceramic is 145 micrometers. On the other hand, focal point change is small because of the longitudinal magnification of 0.25, though the focal length change of the parabolic mirror is 2.8 micrometers. Similarly, when the radius is 1 millimeter or less and the lateral magnification of the partial system of the parabolic reflecting mirror is one time or less, blur of an image due to a temperature change of the image point is reduced, and a suitable optical system can be obtained with a simple structure without arranging the image point compensation unit with a complicated structure described in Japanese Patent Publication No. 2907203.

Figure 7A:
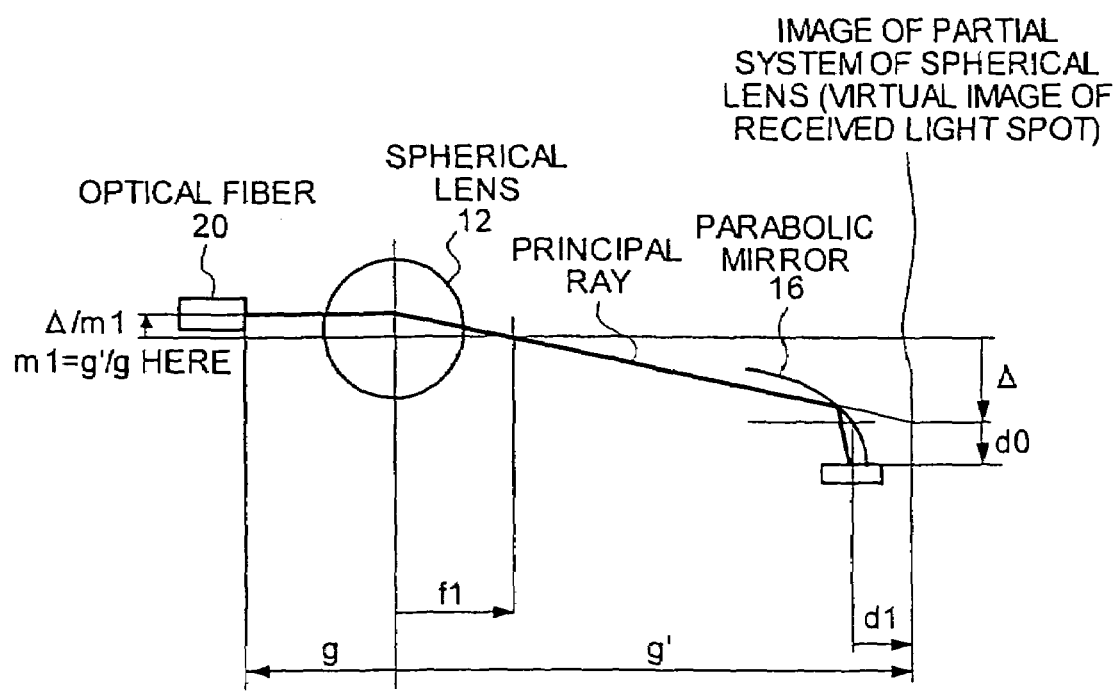
FIGS. 7A and 7B are diagrams for explaining relationship between space between an object point and a lens and distance between an R point and an image point.
Figure 7B:
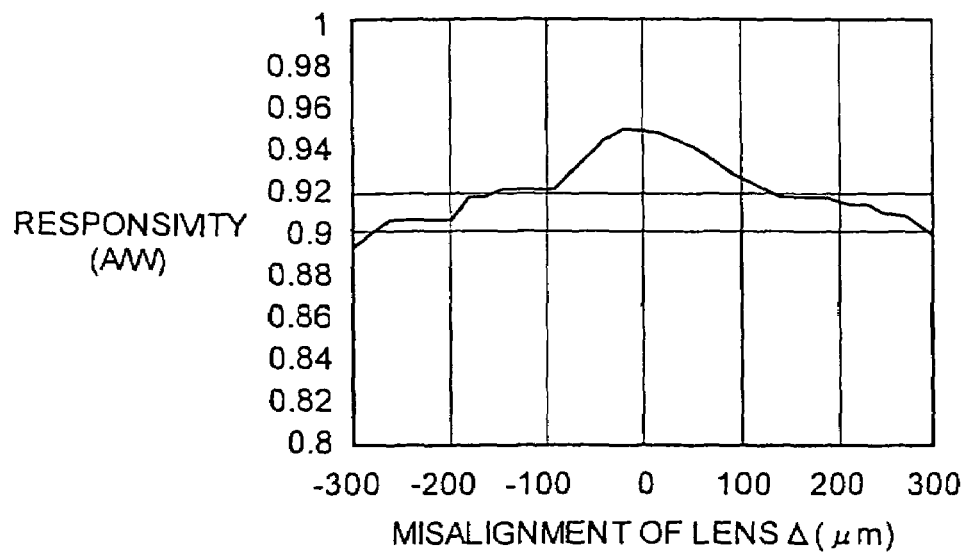

The merits of the optical system are further explained with reference to FIG. 7A and FIG. 7B. As illustrated in FIG.

2, the lens 12 is mounted in the cap 13, and the cap 13 is welded on the stem 10 to produce an air-tight structure, by a method such as projection welding. However, it is relatively difficult to secure position accuracy in the welding step. For example illustrated in FIG. 7A, if misalignment Δ between the reflecting point R of the parabolic mirror 16 and the central axis of the lens 12 takes place when welding, a decrease in the light detection sensitivity about 2% occurs, when the misalignment Δ is 100 micrometers, as shown in FIG. 7B, due to the optical fiber 20 alignment Δ/ml from the lens center 12. Also, proper adjustment g between the lens principal plane and the fiber 20, where m1 is lateral magnification of the partial system of the lens, is required. With such a constitution, when the optical fiber 20 or the receptacle 2 is adjusted properly in the optical axial direction and a direction perpendicular to the optical axis, misalignment of respective parts are compensated for, so that a suitable optical coupling can be obtained.

Figure 8A:
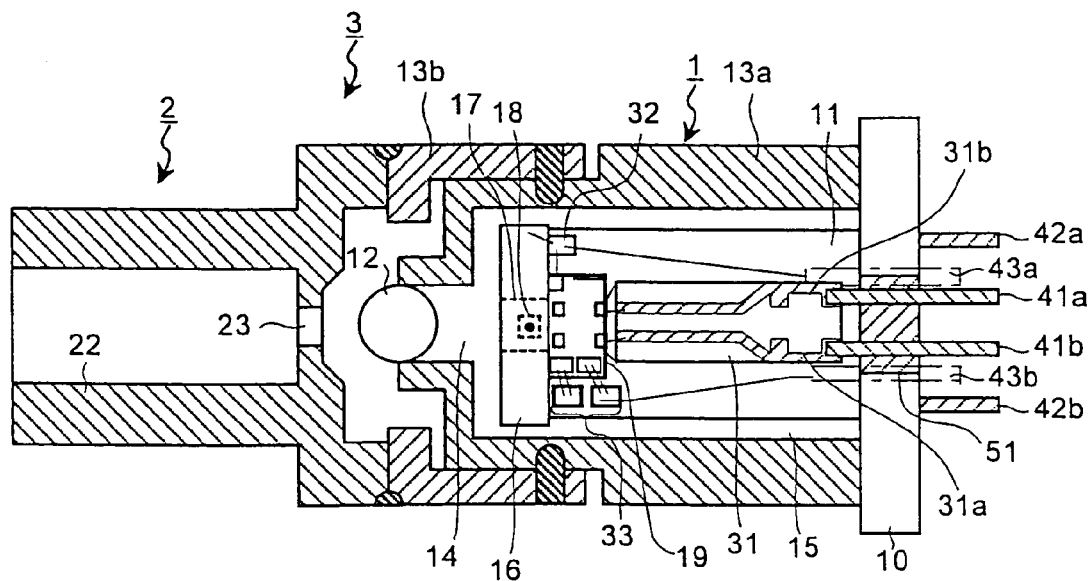
FIGS. 8A and 8B are a horizontal sectional view and a vertical sectional view, respectively, of the light receiving element module in FIG. 1.
Figure 8B:
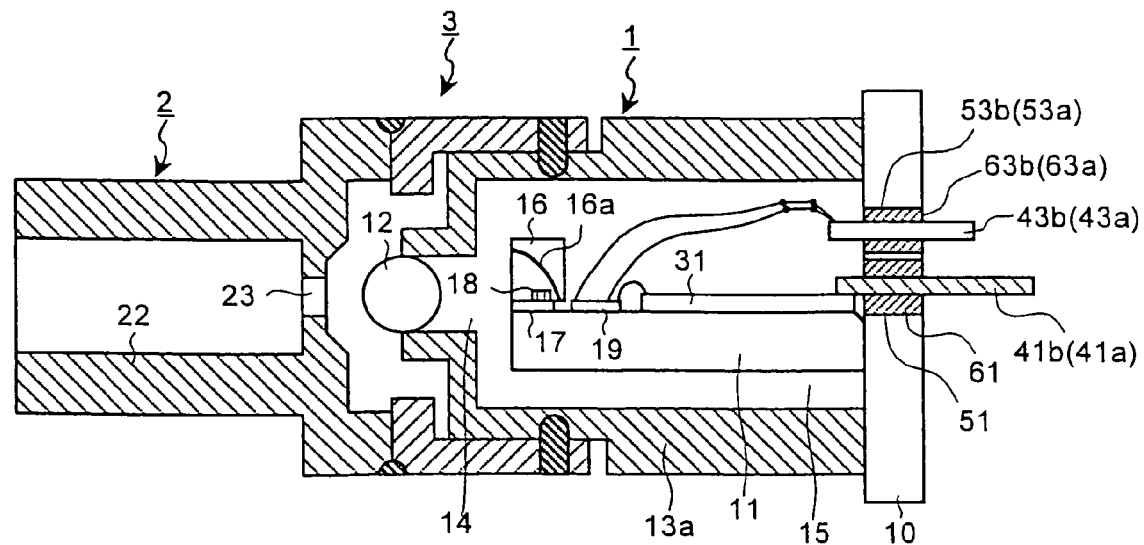

A detailed constitution of the light receiving element module 3 of FIG. 1 will be explained next. FIGS. 8A and 8B illustrate a horizontal sectional view and a vertical sectional view of the light receiving element module 3 of FIG. 1. As illustrated in FIGS. 8A and 8B, the light receiving element module 3 is provided with a disc-like stem 10 mounted with signal pins 41a and 41b that constitute a differential feed, a supplying pin 43a for a bias voltage to a photodiode 18, a supplying pin 43b for a power source voltage to the trans-impedance amplifier 19, ground pins 42a and 42b and the like, a trapezoidal column-shape base 11 mounted with a parabolic mirror 16 and a plurality of elements, a spherical lens 12 for condensing signal light emitted from the optical fiber 20, a cylindrical cap member 13 for sealing the base 11 and the like from the outside, a receptacle 2 in which a ferrule 21 connected with the optical fiber 20 is inserted, and the like.

The cap member 13 exhibits a two-stage cylindrical shape so as to include a first cap member 13a fixed to the stem 10 by projection welding or the like and a second cap member 13b fitted on a distal end of the first cap member 13a and fixed to the first cap member 13a by YAG welding or the like.

A light passing-through hole 14 for insertion of the spherical lens 12 is formed at a distal end of the first cap member 13a, and the spherical lens 12 is inserted into the light passing-through hole 14. The spherical lens 12 is constituted with, for example, BK7 (a refractive index of 1.51), and it is fixed to the first cap member 13a by solder glass with a low melting point. An inner space 15 of the first cap member 13a is isolated by the spherical lens 12 from the outside, so that the inner space 15 in which the base 11 is accommodated is maintained in an air-tight state.

By positioning and adjusting the second cap member 13b in a direction in which the ferule 21 (refer to FIG. 2) is inserted (in an optical axial direction) to fix the same to the first cap member 13a, alignment between the spherical lens 12 and the optical fiber 20 inserted into the receptacle 2 in the optical axial direction is performed.

The receptacle 2 has a ferule insertion hole 22 in which the ferrule 21 connected with the optical fiber 20 and a light passing-through window 23 for allowing passing-through of signal light emitted from the optical fiber 20. The receptacle 2 is fixed to the second cap member 13b by YAG welding or the like. When the receptacle 2 is fixed to the second cap member 13b, positioning between the spherical lens 12 and the optical fiber 20 mounted to the receptacle 2 regarding two directions perpendicular to the optical axis is aligned by conducting positioning and adjusting in the two directions perpendicular to the optical axis. Thus, when the second cap member 13b and the receptacle 2 are fixed, they are positioned and adjusted, so that adjustment in three axial directions to the optical axis is performed.

The ferrule 21 connected with the optical fiber 20 has a proper mechanism (not illustrated) for, when the ferrule 21 is inserted into the ferrule insertion hole 22 of the receptacle 2, pressing the ferrule 21 to lock and fix the ferrule 21 to the receptacle 2.

The constitution of the interior of the can package 1 will be explained next. FIGS. 9A and 9B illustrate arrangement relationship among the stem 10, the pins and the base 11. As illustrated in FIGS. 9A and 9B, the can package 1 is constituted with a disc-like stem 10 with a plurality of pins and a trapezoidal column-like base 11 fixed to an inner wall face of the stem 10 in a direction perpendicular thereto by Ag brazing or the like.

The stem 10 constituting a ground is mounted with a pair of signal pins 41a and 41b constituted differential feed for signal transmission of the light receiving element 18, two ground pins 42a and 42b placed on both sides of the signal pins 41a and 41b, and voltage supplying pins 43a and 43b for supplying a power source voltage of the trans-impedance amplifier 19 and supplying a bias voltage to the light receiving element 18.

The signal pins 41a and 41b and the ground pins 42a and 42b constitute a field-through which penetrates the stem 10. These respective signal pins are fixed to the stem 10 in an air-tight sealing state via dielectrics (61, 63a, and 63b) formed from material such as glass. The ground pins 42a and 42b are fixed to an outer wall face 10z of the stem 10 constituting the ground by pressure-fitting and welding.

In further detailed explanation, the stem 10 is formed of metals such as kovar (Fe—Ni alloy), soft iron or CuW (copper tungsten), and plating of Ni, gold or the like is ordinarily applied to an upper layer of the stem. Further, for example, in the case of kovar (Fe—Ni alloy) or soft iron, the stem 10 can be manufactured by punching out a metal plate thereof with a die. For example, in the case of CuW, the stem can be manufactured using a metal injection molding technique, and the manufacturing cost is low because of the process is simple. The stem 10 includes a plurality of holes 51, 53a, and 53b in a dispersed manner, and dielectrics 61, 63a, and 63b are respectively inserted into these holes 51, 53a, and 53b.

A pair of pin insertion holes (reference numerals are omitted) are formed in the dielectric 61, and the signal pins 41a and 41b are inserted and fixed in these pin insertion holes. Similarly, holes (reference numerals are omitted) are respectively formed in the dielectrics 63a and 63b, and voltage supplying pins 43a and 43b are inserted and fixed in the respective holes. The shape of the dielectric 61 in which the pair of signal pins 41a and 41b are inserted is an elliptic shape in this case. Correspondingly, the hole 51 in which the dielectric 61 is inserted is also an elliptic shape. The other dielectrics 63a and 63b are formed in a circular shape. Incidentally, the ground pins 42a and 42b do not penetrate the stem and are fixed to the outer wall face 10z of the stem 10 by pressure-fitting and welding, as described above.

As the dielectrics 61, 63a, and 63b, for example, kovar glass (soda barium glass), boro-silicated glass, or the like is used. Further, as the signal pins 41a and 41b, the voltage supplying pins 43a and 43b, and the ground pins 42a and 42b, for example, a metal such as kovar, 50% Ni—Fe alloy, or the like is used.

When the stem 10 and the base 11 are manufactured as separate members from each other, the base 11 is connected and fixed to the stem 10 by Ag brazing or the like. Of course, the stem 10 and the base 11 may be manufactured as an integral member.

A differential line substrate 31, a trans-impedance amplifier circuit element 33, a light receiving element circuit element 32, a trans-impedance amplifier 19, a parabolic mirror 16, and a light receiving element substrate 17 are mounted on an upper face of the base 11. When a capacitor of a ceramic chip type is used as the substrate 17 for a light receiving element, connection with the light receiving element is achieved by soldering fixation so that inductance can be reduced and resonance due to wiring with the trans-impedance amplifier 19 or the like can be prevented, which is preferable. The base 11 constitutes a whole ground conductor layer (hereinafter, "solid ground") by plating, and the solid ground is connected to a ground formed on a back face of each element as flat conductor plates.

The differential line substrate 31 includes a pair of differential microstrip lines 31a and 31b formed symmetrically, and a solid ground (not illustrated) formed on a back face of the substrate. One ends of the differential microstrip lines 31a and 31b are formed with a pair of pads (91a and 91b), wider portions 92, and stubs 93a and 93b for taking impedance matching with a field-through portion and front side and rear side circuits. End portions of the signal pins 41a and 41b mounted on the stem 10 are connected and fixed to the pads of the differential line substrates 31 by brazing or soldering.

The light receiving element circuit element 32 is mounted with a circuit element (a capacitor, a resistance, a coil or the like) for eliminating noises in a certain frequency band when a bias voltage is applied to the light receiving element 18 mounted on the substrate 17 for a light receiving element. The light receiving element circuit element 32 is formed with a plurality of pads (reference numerals are omitted), it is connected to the voltage supplying pin 43a via a wire bond 95a and is connected to a pad of the light receiving element substrate 17 via another wire bond 70c.

A trans-impedance amplifier circuit element 33 is mounted with a circuit element (a capacitor, a resistance, a coil or the like) for eliminating noises in a certain frequency band of a power source voltage supplied to the trans-impedance amplifier 19. The trans-impedance amplifier circuit element 33 is formed with a plurality of pads (reference numerals are omitted), and it is connected to the voltage supplying pin 43b via a wire bond 95b and is connected to the pad of the trans-impedance amplifier 19 via a wire bond 70d.

An output terminal for a differential signal from the trans-impedance amplifier 19 is connected to pads of the differential line substrate 31 and the like via wire bonds 96a and 96b. Further, the trans-impedance amplifier 19 is connected to pads of the light detecting element 18, the light detecting element circuit element 32 and the like via wire bonds (which will be described later regarding FIGS. 10A, 10B, and 10C). The trans-impedance amplifier 19 converts current/voltage of an electrical signal received from the light detecting element 18 and amplifies the electrical signal.

The light receiving element substrate 17 is mounted with a light receiving element 18 such as, for example, a pin-type photodiode, and it is formed with a plurality of pads (reference numerals are omitted) and is connected to the light receiving element circuit element 32 and the trans-impedance amplifier 19 via wire bonds. The light receiving element 18 receives signal light reflected by the parabolic mirror 16 to convert it to an electric signal (a monitor signal). After the electric signal is amplified by the trans-impedance amplifier 19, the amplified signal is outputted from output terminals for a differential signal in the trans-impedance amplifier 19, and outputted from the signal pins 41a and 41b mounted on the stem 10 via a pair of differential data lines 31a and 31b of the differential line substrate 31 to an upper system.

The parabolic mirror 16 is formed in a plastic mold. As illustrated in FIGS. 8A and 8B, the parabolic mirror 16 has a reflecting surface 16a in the shape of a paraboloid, and includes a groove (refer to FIGS. 10A, 10B, and 10C) for connecting the light detecting element 18 and the trans-impedance amplifier 19 via a wire bond. The reflecting surface 16a is given with a base film with an excellent adhesion such as chromium and then a metal film such as gold, aluminum, silver with a high reflectivity is applied using a method such as electron beam vapor deposition or sputtering. Further, the reflecting film may be one where dielectric film with multiple layers of titanium dioxide or silicon dioxide, or alumina or tantalum pentoxide has been used, or it may be one where a protective film of dielectric has been applied on a metal film. Incidentally, an effect for prevention of short-circuiting with a wire bond can be achieved by applying an insulating film on a surface of the reflecting surface 16a, which is preferable.

The reflecting surface 16a of the parabolic mirror 16 reflects signal light condensed by the spherical lens 12 at an angle of about 90° so the signal light reaches the light detecting face 18a of the light detecting element 18, and the reflecting surface 16a has a parabolic shape, so that aberrations are hardly generated and the responsivity of the light detecting element 18 can be increased.

By reflecting a raypath of signal light at almost a right angle by the parabolic mirror 16 in this manner, it is made possible to arrange the spherical lens 12 and various electric parts at a position horizontal direction to the surface of the light receiving element 18, and it is made possible to reduce the thickness of the light receiving element module.

Figure 10A:
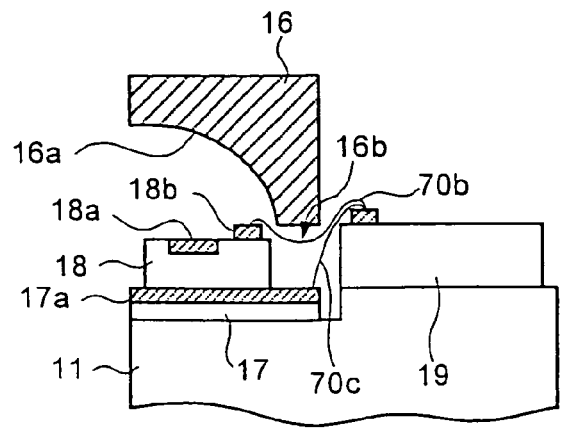
FIGS. 10A, 10B, and 10C are, respectively, a vertical sectional view of the periphery of a parabolic mirror of the light receiving element module, a front view of the mirror, and a plan view of the light receiving element module with the mirror removed.
Figure 10B:
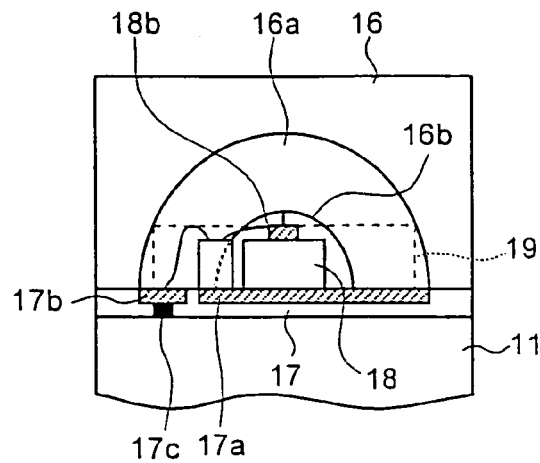
Figure 10C:
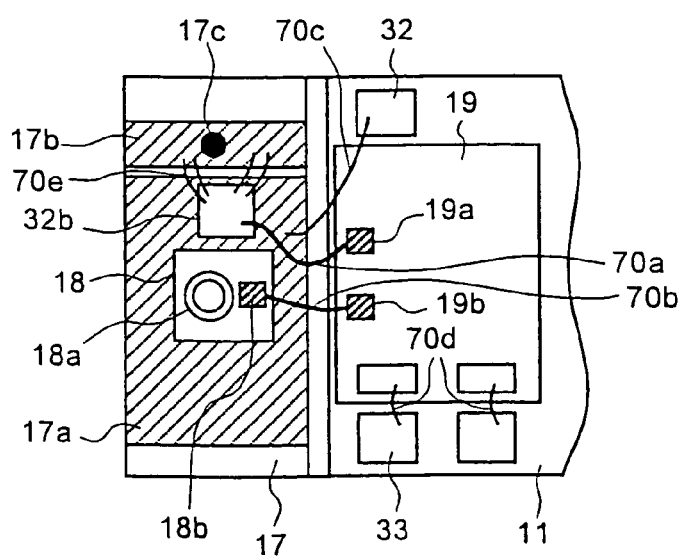

FIGS. 10A, 10B, and 10C are diagrams for explaining electrical connection of the light detecting element 18 and the trans-impedance amplifier 19, wherein FIG. 10A is a vertical sectional view of the periphery of the parabolic mirror 16, FIG. 10B is a front view, and FIG. 10C is a plan view when the parabolic mirror 16 has been removed. As illustrated in FIGS. 10A to 10C, the light detecting element 18 and the trans-impedance amplifier 19 are mounted on one flat face of the base 11 in proximity to each other. The light detecting element 18 mounted on the light receiving element substrate 17 includes a photodiode of a surface incident type having a light detecting face on a surface side, and a light detecting face (a photodiode portion) 18a and a pad 18b (for example, a p-side electrode) which is an electrode on the surface side. Further, an electrode (for example, an n-side electrode) is located on the side of the light receiving element substrate 17.

A groove 16b for connecting the light detecting element 18 and the trans-impedance amplifier 19 by a wire bond is formed on the parabolic mirror 16. Incidentally, the groove 16b has a semi-cylindrical shape in the drawing, but it is not limited to this shape. For example, the groove may have a rectangular parallelepiped shape. That is, if the groove penetrates the parabolic mirror 16 like a tunnel in a state that the parabolic mirror 16 has been mounted on the base 11, it can take any shape. A pad 19b for inputting an electric signal and a ground 19a are formed on the trans-impedance amplifier 19. A pad 18b on an anode side of the light detecting element 18 and the pad 19b of the trans-impedance amplifier 19 are respectively bonded to one end and the other end of a wire bond 70b. An electrode (not illustrated) on a cathode side of the light detecting element 18 is soldered an electrode 17a of the light receiving element substrate 17. An electrode 17a of the light receiving element substrate 17 is connected to a light receiving element circuit element 32 via a wire bond 17c, and the light receiving element circuit element 32 is connected to a voltage pin 43a. An electrode on a back face of a capacitor 32b is connected to the electrode 17a of the light receiving element substrate 17. An electrode on a surface of the capacitor 32b is connected to a ground face 17b of the light receiving element substrate 17 via a wire bond 70e. Further, an electrode on a surface of the capacitor 32b is connected to the ground 19a of the trans-impedance amplifier 19 via a wire bond 70a. The ground face 17b of the light receiving element substrate 17 is connected to a surface (a ground face) of the base 11 via a through hole 17c.

Figure 11A:
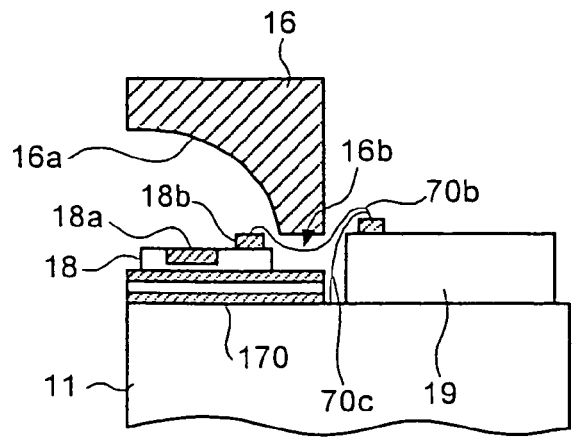
FIGS. 11A, 11B, and 11C are, respectively, a vertical sectional view of the periphery of a parabolic mirror of the light receiving element module, a front view of the mirror, and a plan view of the light receiving element module with the mirror removed.
Figure 11B:
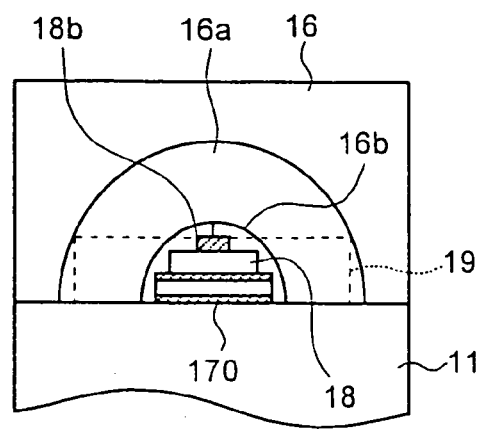
Figure 11C:
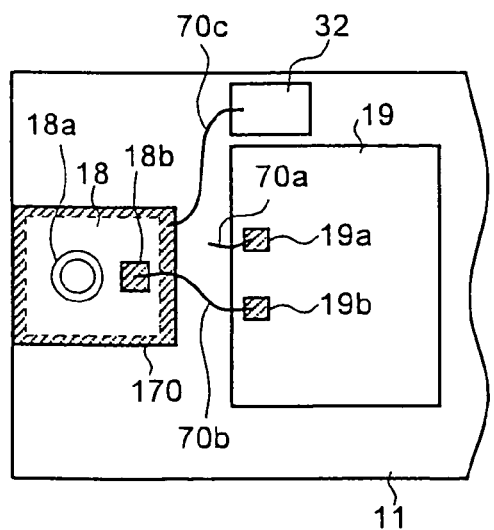

FIGS. 11A to 11C are diagrams for explaining electrical connection of the light detecting element 18 and the trans-impedance amplifier 19, wherein, as another example. FIGS. 10A to 10C, FIG. 11A is a vertical sectional view of the periphery of the parabolic mirror 16, FIG. 11B is a front view and FIG. 11C is a plan view when the parabolic mirror 16 has been removed. As illustrated in FIGS. 11A to 11C, the structure may be simplified by using a parallel flat-plate capacitor 170 of a ceramic chip type instead of the light receiving element substrate 17. In this case, a back face of the light detecting element 18 is mounted on an upper face of the capacitor 170 of a ceramic chip type and the back face of the capacitor 170 of a ceramic chip type is connected to a ground face of the base 11. That is, flat faces of electrodes at both ends of the capacitor 170 are made parallel, fixation is made such that the electrode at a lower end of the capacitor 170 is electrically connected to the ground face of the base 11, and placement is made such that the electrode at an upper end of the capacitor 170 is electrically connected to the electrode at a back face side of the photodiode. Further, the ground 19a of the trans-impedance amplifier 19 is connected to the ground face of the base 11 in the same manner as. in FIGS. 10A to 10C. Furthermore, the pad 19b of the trans-impedance amplifier 19 is connected to the pad 18b of the light detecting element 18.

According to the light receiving element module of the first embodiment, since such a constitution is employed that signal light emitted from the optical fiber 20 is condensed by the spherical lens 12 and the condensed signal light is reflected by the parabolic mirror 16, the region of the reflecting surface 16a of the parabolic mirror 16 can be made small, and the parabolic mirror 16 can be reduced in size. Thereby, it is made possible to reduce the light receiving element module in size. Furthermore, influence of a thermal expansion coefficient due to material for the reflecting mirror is reduced and structure is simplified.

Further, since the parabolic mirror 16 is constituted so as to reflect signal light to an approximately right angle at a position approximately offset from the center of the paraboloid by an approximately half radius and to incident the signal light to the light receiving element 18, aberration due to the parabolic face (the reflecting surface) of the parabolic mirror 16 can be decreased and image blur can be reduced.

Furthermore, since such a constitution is employed that signal light is condensed by the spherical lens 12 and the parabolic face of the parabolic mirror 16, it is made possible to reduce the refractive power due to the spherical lens 12 to reduce image blur due to the spherical aberration.

Moreover, since use of three-axis alignment in the fixing process of the second cap member 13b and the receptacle 2, an image of signal light can be accurately positioned to the light receiving face 18a of the light receiving element 18.

In addition, since the light receiving element 18 and the trans-impedance amplifier 19 are mounted on the base 11 in proximity to each other, it is made possible to improve a high frequency characteristic.

Further, by using the capacity of the ceramic chip type on the light receiving element substrate 17, it is made possible to prevent resonance owing to inductances of wire bonds 70a and 70b connecting the light receiving element 18 and the trans-impedance amplifier 19.

Since the light passing-through hole 14 in which the spherical lens 12 is inserted is in the cap member 13 and a sealed structure is realized by inserting the spherical lens 12 into the light passing-through hole 14, a reliable sealed structure can be realized inexpensively.

In this connection, in the first embodiment, the parabolic mirror is used as a reflecting mirror having a quadric surface reflecting surface, a hyperboloid mirror whose reflecting surface is a hyperboloid may be used. Further, in the first embodiment, though the photodiode is used as the light receiving element 18, another photo-semiconductor element such as an avalanche photodiode can be used.

Second Embodiment

Figure 12A:
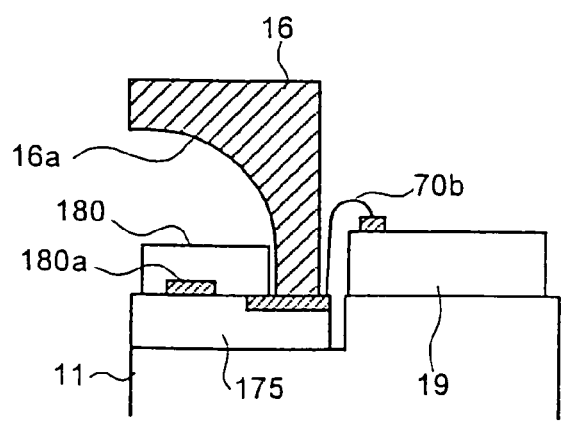
FIGS. 12A, 12B, and 12C are, respectively, a vertical sectional view of the periphery of a parabolic mirror of the light receiving element module, a front view of the mirror, and a plan view of the light receiving element module with the mirror removed.
Figure 12B:
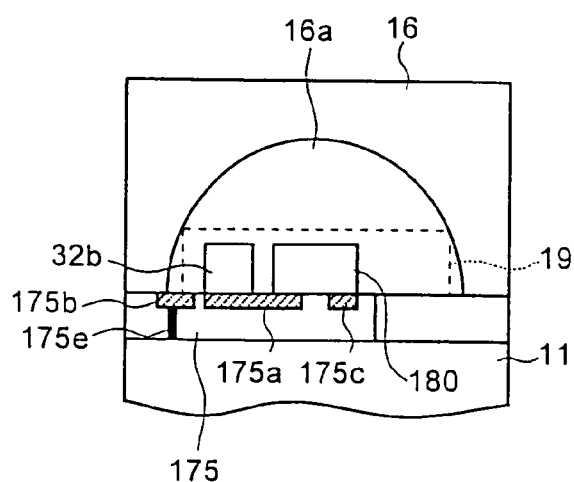
Figure 12C:
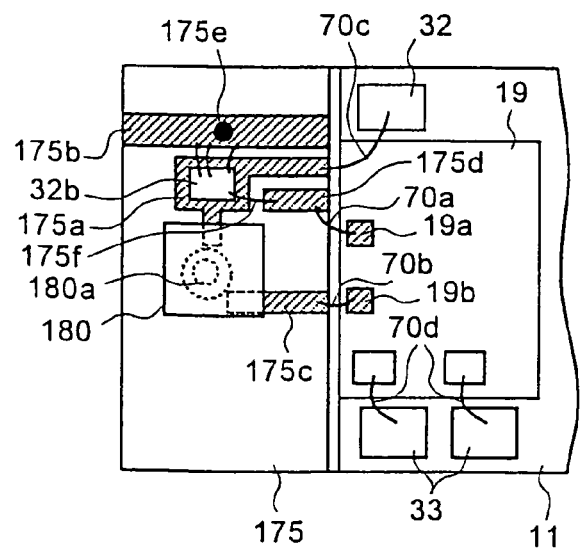

A light receiving element module of the second embodiment will be explained with reference to FIGS. 12A to 12C. In the light receiving element module of the first embodiment, the photodiode 18 of the surface incident type is used as the light detecting element. In the light receiving element module of the second embodiment, a photodiode 180 of a back surface incident type is used so that a groove of the parabolic mirror 16 for connecting the light detecting element 180 and the trans-impedance amplifier 19 via a wire bond becomes unnecessary. FIGS. 12A to 12C are diagrams for explaining electrical connection of the light detecting element 180 and the trans-impedance amplifier 19, wherein FIG. 12A is a vertical sectional view of the periphery of the parabolic mirror 16, FIG. 12B is a front view and FIG. 12C is a plan view where the parabolic mirror 16 has been removed. In FIGS. 12A, 12B, and 12C, like reference numerals are designated to portions having functions equivalent to those in FIGS. 10A, 10B, and 10C.

As illustrated in FIGS. 12A, 12B, and 12C, a light detecting element 180 mounted on a light receiving element substrate 175 includes a photodiode of a back face incident type having a light detecting face on a back face, and a light detecting face (a photodiode portion) 180a is formed on the back face side. A pair of electrodes 175a and 175c (a pair of p-side and n-side electrodes) are formed on surface side of the light receiving element substrate 175. A pair of unillustrated terminals (an anode and a cathode) of the light detecting element 180 are respectively connected to the electrodes 175a and 175c of the light receiving element substrate 175 by soldering. Further, a back surface electrode of a capacitor 32b is soldered on an upper face of the electrode 175a. A surface electrode of the capacitor 32b is connected to another conductor pad 175b of the light receiving element substrate 175. The conductor pad 175b is connected to a surface of the base 11 via a through hole 175e. One end of a wire bond 70a is bonded to another conductor pad 175d of the light receiving element substrate 175, and the other end of the wire bond 70a is connected to a pad 19a of the trans-impedance amplifier 19. The surface electrode of the capacitor 32b is also connected to a conductor pad 175d of the light receiving element substrate 175. One end of a wire bond 70b is connected to an electrode 175c and the other end of the wire bond 70b is bonded to a pad 19b of the trans-impedance amplifier 19.

According to the light receiving element module of the second embodiment, since the photodiode of the back face incident type is used as the light detecting element 180, it is made unnecessary to provide the groove 16b (refer to FIGS. 10A to 10C) in the parabolic mirror 16 for connecting the light detecting element 180 and the trans-impedance amplifier 19 via a wire bond, so that working for the groove 16b of the parabolic mirror 16 is made unnecessary and manufacturing cost of the parabolic mirror 16 can be reduced.

Third Embodiment

A light receiving element module of the third embodiment will be explained with reference to FIG. 13. In the light receiving element module of the first embodiment, the trans-impedance amplifier 19 is arranged on a rear stage side of the light receiving element 18 on the base 11. In the light receiving element module of the third embodiment, the trans-impedance amplifier 19 is arranged on a front stage of the light receiving element 18 on the base 11, so that space saving in a widthwise direction (a horizontal direction) of the light receiving element module 3 is achieved. FIG. 13 schematically illustrates a vertical sectional view of the light receiving element module 3 of FIG. 1, where some portions are omitted and some portions are illustrated in a simplified manner. In FIG. 13, like reference numerals are designated to portions having functions equivalent to those in FIG. 2. As illustrated in FIG. 13, the trans-impedance amplifier 19 is arranged on a front stage side of the light receiving element 18 and the parabolic mirror 16 is arranged on a rear stage side of the light receiving element 18. At this time, the parabolic mirror 16 is provided to the strip differential data lines 31a and 31b such that the differential microstrip lines 31a and 31b do not interfere with the light receiving element 18.

According to the light receiving element module of the third embodiment, since the trans-impedance amplifier 19 is arranged on the front stage side of the light detecting element 18 on the base 11, it is made possible to save space in the widthwise direction (a horizontal direction) of the light receiving element module by the space for the trans-impedance amplifier 19, as compared with the light receiving element module of the first embodiment.

Furthermore, the wire bonds 70a and 70b for connecting the trans-impedance amplifier 19 and the light receiving element 18 can be arranged ahead of the parabolic mirror 16 (on the side of the optical fiber 20), and the trans-impedance amplifier 19 and the light receiving element 18 can be connected to each other as shown in FIGS. 10A, 10B, and 10C.

Fourth Embodiment

Figure 14:
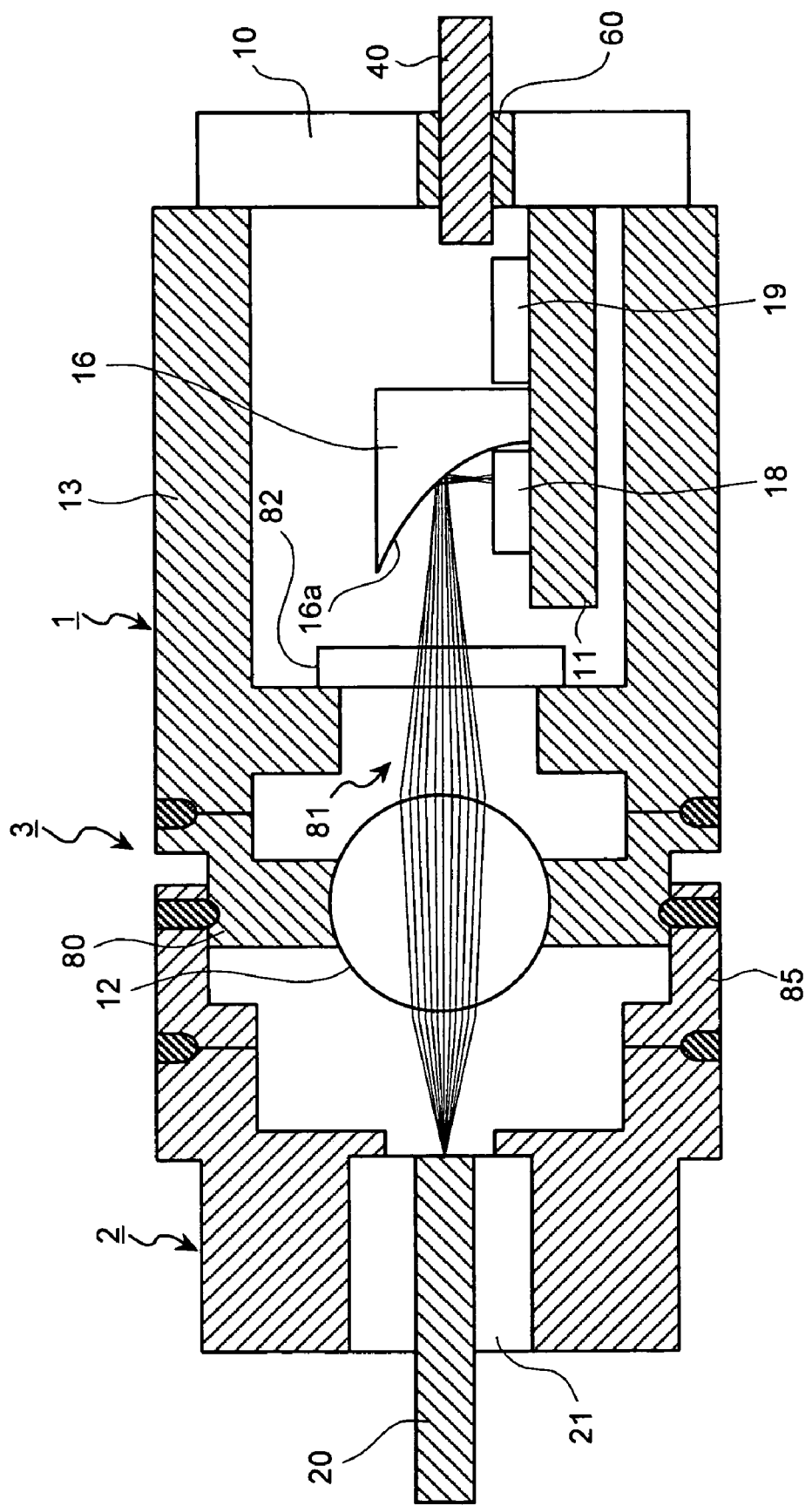
FIG. 14 explains a light receiving element module of a fourth embodiment.

A light receiving element module of the fourth embodiment will be explained with reference to FIG. 14. In the light receiving element module of the first embodiment, the sealed structure is formed by inserting the spherical lens 12 into the light passing-through hole formed in the cap member 13. In the light receiving element module of the fourth embodiment, a sealed structure is formed by arranging a transparent member in the light passing-through hole formed in the cap member 13. FIG. 14 schematically illustrates a vertical sectional view of the light receiving element module of FIG. 1, where some portions are omitted and some portions are illustrated in a simplified manner. In FIG. 14, like reference numerals are designated to portions having functions equivalent to those in FIG. 2.

A lens holding member 80 which holds the lens 12 is provided between the receptacle 2 and the cap member 13. An end face of the lens holding member 80 is joined to one end face of the cap member 13 on the side of a light passing-through hole 81 by welding or the like. Further, an outer periphery of the lens holding member 80 is fitted into an inner periphery of a connection member 85 on its one end side, and the connection member 85 is slid to the lens holding member 80 and welded thereto. An end face of the connection member 85 on the other end is welded to an end face of the receptacle 2 opposed to the hole 22 thereof.

As illustrated in FIG. 14, a light passing-through hole 81 is formed in the cap member 13, and the light passing-through hole 81 is covered with a transparent member (a window member) 82 which is formed of cover glass or the like and is fixed to an inner wall of the cap member 13 including the light passing-through hole 81 by a solder glass or the like. A sealed structure is achieved by the transparent member 82. The lens holding member 80 which has a cylindrical shape and, where a light passing-through hole for inserting the spherical lens 12 is located, is fixed to the cap member 13. The spherical lens 12 is inserted into the light passing-through hole and fixed therein by adhesive or the like. Further, the receptacle 2 is fixed in the lens holding member 80.

According to the light receiving element module of the fourth embodiment, since the sealed structure is realized by fixing the transparent member 82 to the inner wall side of the cap member 13 formed with the light passing-through hole 81 to cover the light passing-through hole 81, the sealed structure can be realized inexpensively and it is made possible to realize a reliable sealed structure.

It should be noted that the present invention is not limited to the embodiments described above, and various modifications may be embodied without changing the gist of the invention.

As explained above, according to the present invention, since the light receiving element module includes a lens which condenses signal light emitted from an optical fiber, a reflecting mirror which has a quadric surface reflecting surface reflecting the signal light condensed by the lens, and a light detecting element which detects the signal light reflected by the reflecting mirror and converts the light into an electrical signal, the region of the reflecting surface of the reflecting mirror can be made small and the reflecting mirror can be reduced in size. As a result, influence of a thermal expansion coefficient due to material for the reflecting mirror can be reduced and structure of the module can be simplified. Further, it is made possible to provide an inexpensive light receiving element module which can be reduced in size.

INDUSTRIAL APPLICABILITY

As described above, the light receiving element module according to the present invention can be widely applied to a receiver and a transceiver for an optical communication system using an optical fiber.

The invention claimed is:

1. A light detecting element module comprising:
a lens condensing signal light emitted from an optical fiber;
a reflecting mirror having a quadric reflecting surface, an axis, and a center intersected by the axis, the reflecting mirror reflecting the signal light condensed by the lens; and a light detecting element detecting the signal light reflected by the reflecting mirror and converting the signal light into an electrical signal, wherein the signal light condensed by the lens is incident on the quadric reflecting surface generally parallel to the axis of the quadric reflecting surface, and the signal light incident on the quadric reflecting surface within approximately one-half radius of the center of the quadric reflecting surface is reflected at approximately a right angle to the axis of the quadric reflecting surface.

2. The light detecting element module according to claim 1, wherein a real images at an emitting point of the signal light in the optical fibers is imaged by the lens to form a virtual image at a light detecting face of the light detecting element, on an optical axis of the lens, with the reflecting mirror.

3. The light detecting element module according to claim 1, wherein the quadric reflecting surface is parabolic.

4. The light detecting element module according to claim 1, wherein the quadric reflecting surface is a hyperboloid.

5. The light detecting element module according to claim 1, wherein the lens is a spherical lens.

6. The light detecting element module according to claim 1, further comprising a trans-impedance amplifier located on a common plane with the light detecting element, proximate the light detecting elements, and amplifying the electrical signal produced by the light detecting element.

7. The light detecting element module according to claim 1, wherein the reflecting mirror is formed using a plastic mold.

8. The light detecting element module according to claim 1, including adjusting the optical fiber along an optical axis direction and in two directions perpendicular to the optical axis direction.

9. The light detecting element module according to claim 1, wherein the lens has a magnification of at least one and no more than three, the reflecting mirror has a magnification of at least $1/6$ and no more than one, and overall magnification, including the lens and the reflecting mirror is at least 0.5 and no more than one.

10. The light detecting element module according to claim 1, wherein the reflecting mirror has a radius of curvature and a focal length, one of which is no more than 1 millimeter.

11. The light detecting element module according to claim 6, further comprising a capacitor having a ground electrically connected to a ground of the trans-impedance amplifier, wherein the light detecting element, the trans-impedance amplifier, and the capacitor are arranged in substantially the same plane.

12. The light detecting element module according to claim 6, further comprising:

a base; and a capacitor on which the light detecting element is mounted and having a back face connected to a ground face of the base.

13. A light detecting element module comprising:

a stem through which signal pins penetrate;

a base fixed in a direction perpendicular to the stem;

a cap member having a light passing through hole and fixed to the stem;

a spherical lens inserted into the light passing through hole and condensing signal light emitted from an optical fiber;

a parabolic mirror located on the base and reflecting the signal light condensed by the spherical lens at approximately a right angle, wherein;

the spherical lens has a magnification of at least one and no more than three, the parabolic mirror has a magnification of at least $1/6$ and no more than one, and overall magnification, including the spherical lens and the parabolic mirror is at least 0.5 and no more than one;

a light detecting element located on the base, receiving the signal light reflected by the parabolic mirror, and converting the signal light received into an electrical signal; and a trans-impedance amplifier located on the base proximate the light detecting element and amplifying the electrical signal produced by the light detecting element.

14. A light detecting element module comprising:

a stem through which signal pins penetrate;

a base fixed in a direction perpendicular to the stem;

a cap member having a first light-passing through hole and fixed to the stem;

a window member covering the first light passing through hole;

a lens holding member having a second light passing through hole and fixed to the cap member;

a spherical lens inserted into the second light passing through hole and condensing signal light emitted from the optical fiber;

a parabolic mirror located on the base and reflecting the signal light condensed by the spherical lens at approximately a right angle;

a light detecting element located on the base, receiving the signal light reflected by the parabolic mirror, and converting the signal light received into an electrical signal; and a trans-impedance amplifier located on the base proximate the light detecting element and amplifying the electrical signal produced by the light detecting element, wherein the spherical lens has a magnification of at least one and no more than thee, the parabolic mirror has a magnification of at least $1/6$ and no more than one, and overall magnification. including the spherical lens and the parabolic mirror is at least 0.5 and no more than one.

\* \* \* \* \*